May 2, 1944.  A. RASCH  2,348,028

SAUCER

Filed April 6, 1942

INVENTOR.
ALBERT RASCH
BY Birkenbeuel
ATTORNEY.

Patented May 2, 1944

2,348,028

UNITED STATES PATENT OFFICE 2,348,028

SAUCER

Albert Rasch, Portland, Oreg.

Application April 6, 1942, Serial No. 437,811

1 Claim. (Cl. 65—15)

This invention relates generally to utensils and particularly to a saucer.

The main object of this invention is to construct a saucer especially adapted for restaurant use, provision being made thereon for the reception of a coffee cup and creamer.

The second object is to construct a saucer which will be inexpensive to manufacture and which will economize time in the serving of food in restaurants, reduce the spillage and breakage occasioned by the present awkward handling of creamers as well as to eliminate the inconvenience and unpleasantness of overlooking the cream item when serving the customer.

The third object is to construct a saucer that will better hold the cup and creamer without detracting from the waitresses' ability to carry a plurality of saucers at one time.

The fourth object is to so construct the saucer that the coffee cup and cream receptacle will be held in spaced relationship as well as maintaining a fixed relationship to the saucer area itself.

These and other objects are accomplished in the manner set forth in the following specification as illustrated in the accompanying drawing, in which.

Similar numerals refer to similar parts throughout the several views.

Figure 1:
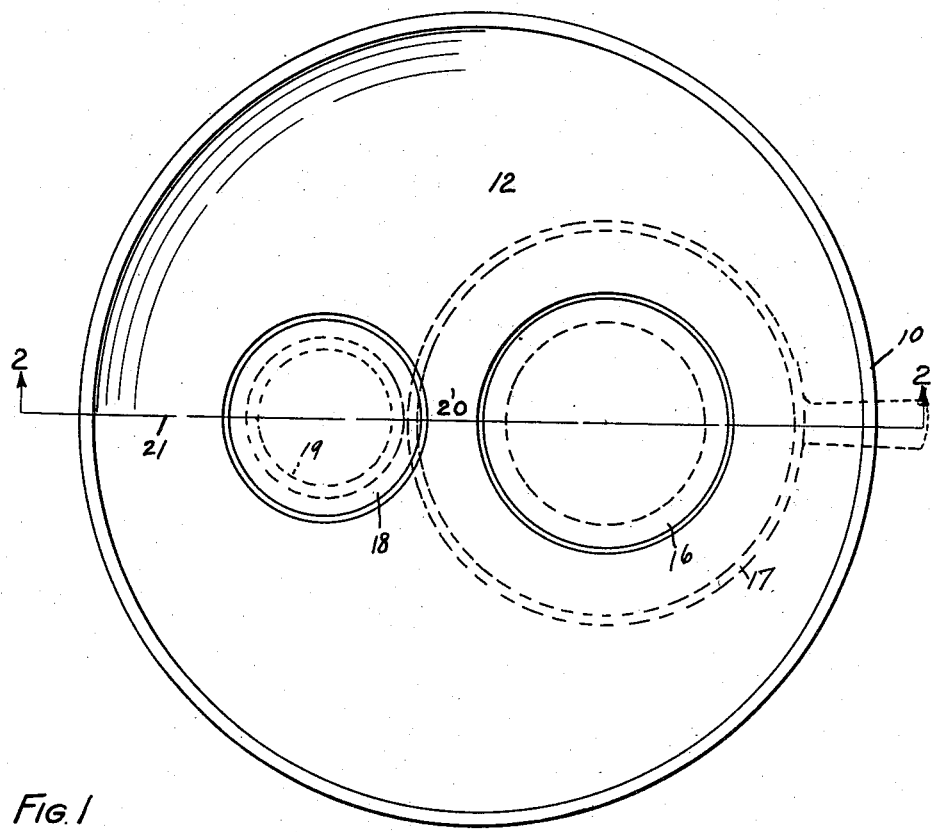
Fig. 1 is a plan of the saucer.
Figure 2:
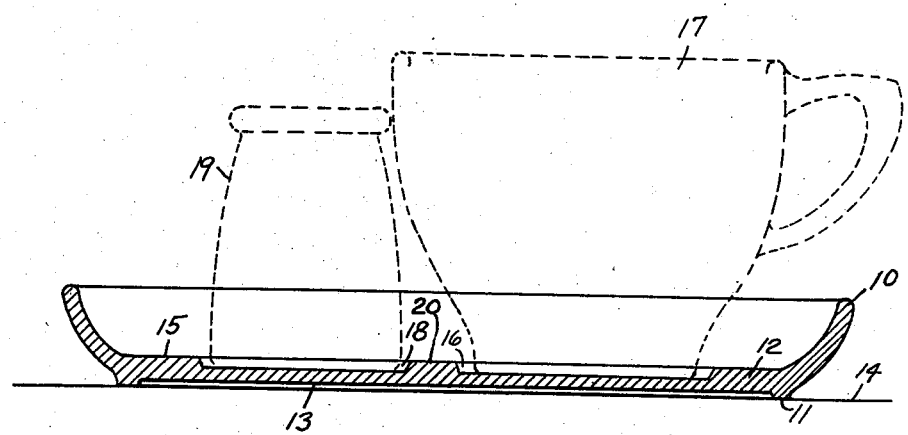
Fig. 2 is a vertical section taken along the line 2—2 in Fig. 1, showing in dotted lines the relative position of the coffee cup and creamer.

Referring in detail to the drawing, there is shown a saucer having a circular rim 10 which curves inwardly to the circular base 11 which supports the horizontal bottom 12 whose underside 13 is preferably elevated somewhat above the table line 14.

In the top surface 15 of the bottom 12 is formed a large recess 16 adapted to freely receive the coffee cup 17. The recess 16 is on one side of the saucer bottom 15 while in the other side of the bottom 12 is formed a smaller recess 18 adapted to receive the creamer 19.

The portion 20 of the bottom 15 between the recesses 16 and 18 is sufficient to permit the cup 17 and creamer 19 to freely occupy the recesses 16 and 18.

It will be noted that while the recesses 16 and 18 have been illustrated as lying along the diameter which coincides with the line 2—2 in Fig. 1, it may, in some instances, be desirable to move the recess 18 to one side of the diameter 21 in order to concentrate the unused area of the saucer.

It will be understood that the saucer may be made from any suitable material and that departure may be made from the illustrated shape without departing from the spirit of this invention.

It is a well known fact that saucers have been constructed wherein the cup retaining recess is not concentric with relation to the saucer, the purpose of which construction is to increase the space for sandwiches and the like, as illustrated in the Gebelein Patent No. 1,544,972, and the Gibbons Patent No. 421,264, and numerous others. It is not my primary purpose to increase the usefulness of a saucer aside from the serving of liquids, although such an advantage naturally follows the construction outlined in the following claim.

I claim:

A combination of a creamer having its maximum diameter at its base, a cup having its minimum diameter at its base, a saucer having a flat bottom whose upper surface is flat, said flat surface having an outer rim and two circular recesses enclosed by said rim, said recesses lying along the diameter of said saucer, one of said recesses being adapted to receive the base of the cup and the other to receive the base of th creamer in a manner that the base of the creamer shall extend under a rim of the cup.

ALBERT RASCH.